United States Patent
Dias

Patent Number: 5,709,533
Date of Patent: Jan. 20, 1998

[54] PROCESS AND A DEVICE FOR REGULATING THE FLOW RATE OF AN AIR CURRENT

[75] Inventor: Dominique Dias, Voisins-Le-Bretonneux, France

[73] Assignee: Valeo Thermique Habitacle, Saint Denis, France

[21] Appl. No.: 775,000

[22] Filed: Dec. 27, 1996

Related U.S. Application Data

[63] Continuation of Ser. No. 230,166, Apr. 19, 1994, abandoned.

[30] Foreign Application Priority Data

Apr. 23, 1993 [FR] France .................................. 93 04848

[51] Int. Cl.$^6$ .......................................................... F04B 49/00
[52] U.S. Cl. ............................ 417/18; 417/20; 417/22; 417/45; 417/43; 454/75; 62/186
[58] Field of Search .................................. 417/18, 20, 22, 417/42, 44.11, 45, 53, 43; 62/186; 454/75; 318/799, 802, 807

[56] References Cited

U.S. PATENT DOCUMENTS

| | | | |
|---|---|---|---|
| 3,983,715 | 10/1976 | Hair, Jr. et al. | 62/83 |
| 4,205,944 | 6/1980 | Rohrberg et al. | 417/32 |
| 4,467,706 | 8/1984 | Batcheller et al. | 98/1.5 |
| 4,667,480 | 5/1987 | Bessler | 62/180 |
| 4,759,269 | 7/1988 | Brown et al. | 98/2.01 |
| 4,806,833 | 2/1989 | Young | 318/335 |
| 4,978,896 | 12/1990 | Shah | 318/254 |
| 5,099,654 | 3/1992 | Baruschke et al. | 62/180 |
| 5,163,818 | 11/1992 | Betsill et al. | 417/18 |
| 5,202,951 | 4/1993 | Doyle | 388/811 |
| 5,335,507 | 8/1994 | Powell | 62/129 |
| 5,400,963 | 3/1995 | Ishikawa et al. | 236/49.3 |

FOREIGN PATENT DOCUMENTS

| | | |
|---|---|---|
| 0363038 | 4/1990 | European Pat. Off. . |
| 0518538 | 12/1992 | European Pat. Off. . |

Primary Examiner—Timothy Thorpe
Assistant Examiner—Xuan M. Thai
Attorney, Agent, or Firm—Morgan & Finnegan LLP

[57] ABSTRACT

The invention is based on the premise that, for a given air blower, the current I consumed by the electric motor, the rotational speed N and the air flow rate Q are interconnected, regardless of the dynamic pressure, by a law Q=f(I, N) which can be experimentally determined on a ventilation bench. In order to perform any adjustment, I and N are measured, from which a calculator derives Q by means of the above-mentioned law. The comparison of the calculated value with the desired flow rate Qd provides an error signal which is applied to a control device which determines the supply voltage (U) of the motor of the blower. The invention is applicable to heating or air-conditioning installations for the passenger space of vehicles.

6 Claims, 2 Drawing Sheets

5,709,533

PROCESS AND A DEVICE FOR REGULATING THE FLOW RATE OF AN AIR CURRENT

This is a continuation of application Ser. No. 08/230,166, filed on Apr. 19, 1994 now abandoned.

BACKGROUND OF THE INVENTION

The invention relates to a process for regulating the flow rate of an air current by means of a blower comprising an electric motor and a turbine driven by the motor and disposed in the path of the air current, in particular in heating/ventilation or air conditioning installations in motor vehicles.

The flow rate of the air current directed into the passenger space by such an installation naturally depends on the characteristics and control of the blower, but also on other parameters, especially the dynamic pressure to which the turbine of the blower is subjected, which is influenced in particular by the speed of the vehicle. For example, acceleration or deceleration of the vehicle produces, all things being otherwise equal, an increase or decrease in the flow rate of air, which may be detrimental to the comfort of the occupants and/or the efficiency of the air conditioning; and as a result it is useful to be able to regulate the flow rate.

Such regulation requires the knowledge of the actual flow rate, to which there is access in known processes, either directly by means of a flowmeter, or indirectly by a pressure measurement. But these flow rate and pressure measurements are difficult to perform in a vehicle.

SUMMARY OF THE INVENTION

The object of the invention is to allow the regulation of the flow rate of air without measuring either the flow rate or the pressure, by using easily accessible values.

The invention particularly relates to a process of the kind defined in the introduction, and specifies that a law $Q=f(I,N)$ is experimentally established between the said flow rate $Q$ and the current $I$ consumed by the motor and its rotational speed $N$, and that, during the use of the impeller, the values $I$ and $N$ are measured, the actual flow rate $Q$ is derived therefrom by means of the said law, this is compared with the desired flow rate, and the result of the comparison is used to modify, if necessary, the power supply to the motor.

The applicant has determined that, for a blower of determined characteristics, the three values $I$, $N$ and $Q$ are connected by a law which enables the flow rate $Q$ to be determined as a function of the two other values. This law governs the simultaneous variation of these three values under the effect of either an external perturbation (variation in dynamic pressure) or an internal perturbation (modification in the power supply of the motor). The current $I$ can easily be measured for example by means of a resistor mounted in series with the motor, and the speed $N$ by the switching frequency in an electronic switching motor, or by a probe such as a Hall effect sensor for a direct current motor.

Other complementary or alternative characteristics of the invention are given below:

To establish the said law, the turbine is subjected to a variable dynamic pressure and the corresponding values of $I$, $N$ and $Q$ are measured. This stage may be performed on an ventilation bench enabling the flow rates to be conveniently measured. It is not necessary to measure the variable dynamic pressure.

For a limited variation range of the magnitudes $I$, $N$ and $Q$, such a law is chosen that variation curves of $N$ correspond to different values of $Q$ as a function of $I$ represented by segments of mutually parallel straight lines.

The actual flow rate is determined by calculation from measured values of $I$ and $N$.

The actual flow rate is determined by reference to a table compiled beforehand giving the value of $Q$ corresponding to each couple $(I, N)$.

The supply voltage of the motor is acted upon to correct the flow rate.

The process according to the invention may in particular be used to regulate the flow rate of an air current to be directed by a heating, ventilation or air-conditioning installation into the passenger space of a vehicle An object of the invention is also a device for regulating the flow rate of an air current by the process defined above, including a blower comprising an electric motor and a turbine driven by the motor, means for evaluating current $I$ consumed by the motor and its rotational speed $N$, means for determining the corresponding flow rate $Q$ by means of said law, means for selecting a desired flow rate $Qd$, means for comparing $Q$ and $Qd$ and for deriving therefrom an error signal, and control means for modifying if necessary the power supply of the motor as a function of the error signal.

BRIEF DESCRIPTION OF THE DRAWINGS

The characteristics and advantages of the invention will be explained in further detail in the following description, with reference to the attached drawings, in which.

DESCRIPTION OF THE PREFERRED EMBODIMENTS

Figure 1:
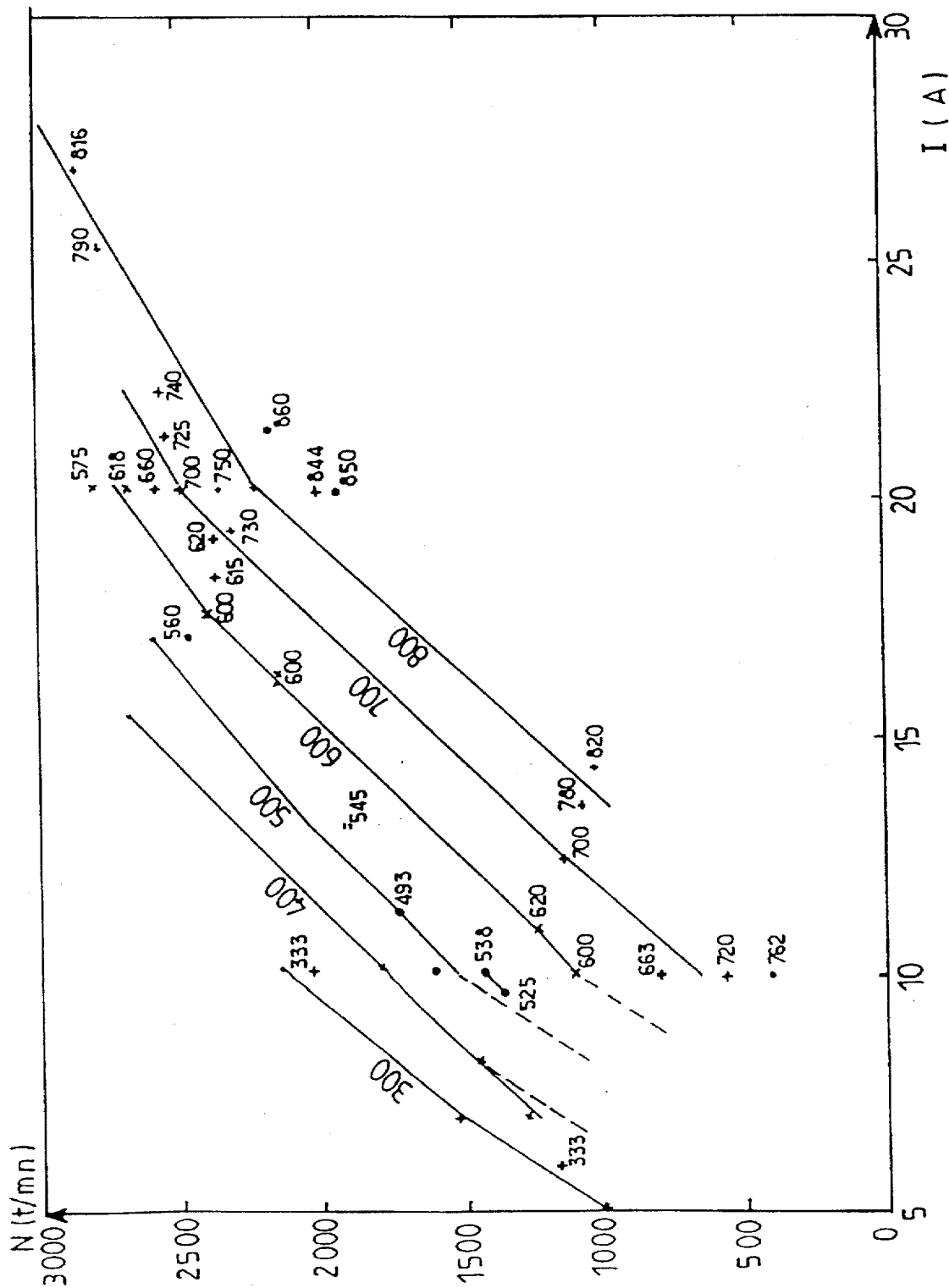
FIGS. 1 and 2 are representative groups of curves of the law $Q=f(I,N)$ relating to two blowers which can be used in heating or air conditioning installations in motor vehicles.
Figure 2:
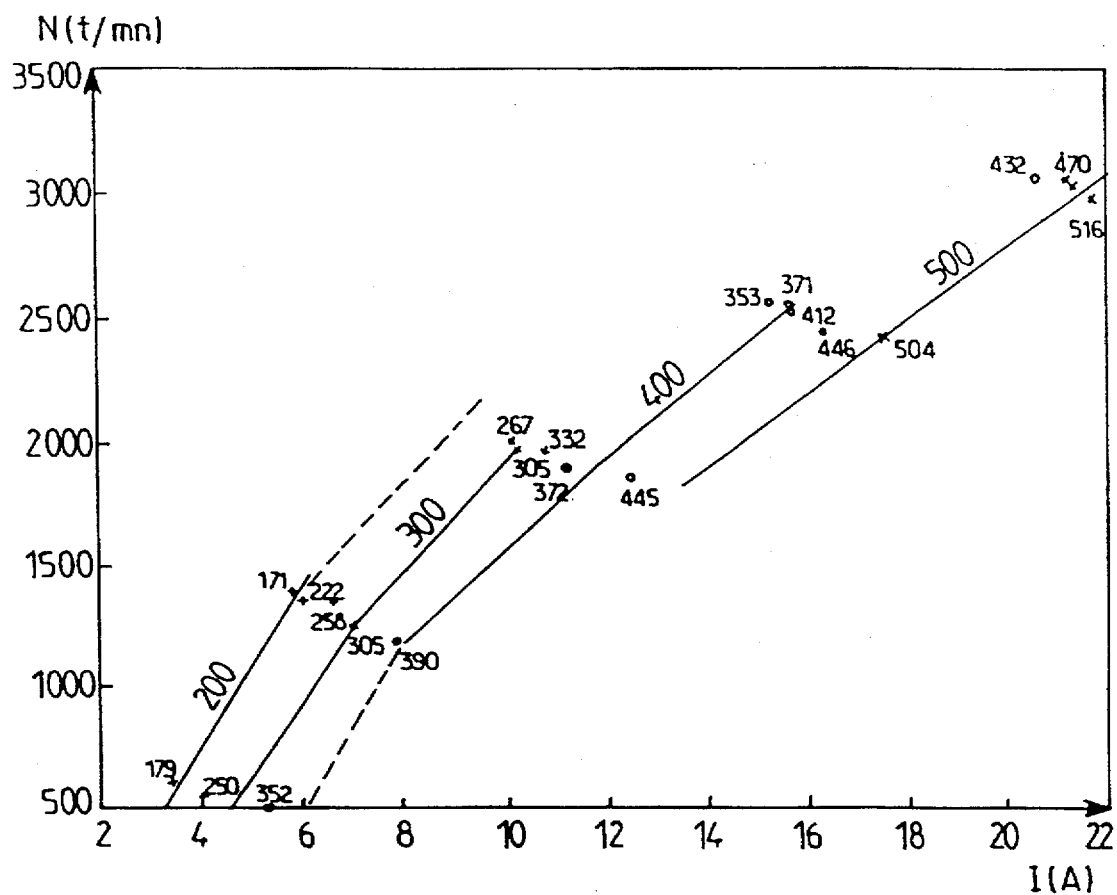

On each of FIGS. 1 and 2 is plotted a network of experimental points obtained on a ventilation bench by varying the supply voltage of the corresponding blower and the dynamic pressure and by measuring the current $I$ (in amperes), the rotational speed $N$ (in revolutions/minute) and the air flow rate O (in liters/minute). The coordinates of each point correspond to the measured values of $I$ and $N$, and the corresponding value of $Q$ is inscribed alongside. Groups of segments of lines have also been plotted, from these experimental points, each of which substantially connects coordinate points $(I, N)$ with which a same value of $Q$ is associated, this value being inscribed beside the segment. Thus it is noted that, for limited variation ranges of the magnitudes $I$, $N$ and $Q$, the law of variation may be approximately represented by a group of mutually parallel line segments corresponding to different values of $Q$. Such a representation simplifies the determination, by calculation, of the flow rate value corresponding to a measured couple $(I, N)$. For wider variation ranges of $I$ and $N$, each curve associated with a value of $Q$ may be represented by a broken line formed by the linking of several of the line segments mentioned above.

Figure 3:
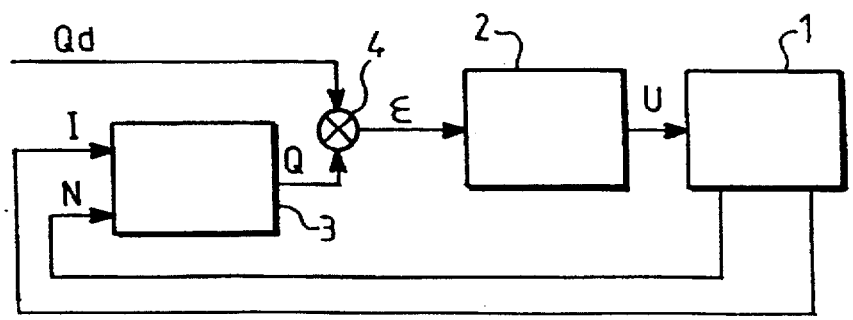
FIG. 3 is a block diagram of a device according to the invention.

The device shown by the diagram of FIG. 3 is intended for the regulation of the flow rate of air in a heating or air-conditioning installation for the passenger space of a motor vehicle. This device comprises a blower 1 for producing the air flow rate, comprising a turbine driven by a direct current motor, for example with electronic switching. The supply voltage U of the motor is fixed by a control device 2. As a function of the external conditions to which the impeller is subjected, and particularly the dynamic pressure, this supply voltage is translated by variable operating parameters, and especially a consumed current I and a rotational speed N. A current $I_1$ consumed by the motor and the motor's rotational speed $N_1$; are measured and transmitted to a calculating device 3 which calculates the air flow rate $Q_1$ by means of the variation law $Q=f(I, N)$. A comparator 4 compares this calculated value $Q_1$ with the desired flow rate Qd, which can be selected manually by means of a rotary control or a cursor on the dashboard of the vehicle, or automatically by a programme compiled beforehand controlling the operation of the air-conditioning installation. The comparator 4 produces an error signal ε which is applied to the control device 2 to correct the supply voltage U if necessary.

The calculator 3 may be replaced by means for examining tables compiled beforehand which associate the corresponding value of Q with each couple (I, N).

Components 1, 2 and 4 may be the same as in known flow rate regulation devices.

What is claimed is:

1. A process for regulating flow rate of an air current by using a blower including an electric motor and a turbine driven by the motor, comprising:

experimentally establishing a law $Q=f(I, N)$ connecting a flow rate Q to current I consumed by the motor and rotational speed N of the motor by subjecting the turbine to a variable dynamic pressure to measure corresponding values of I, N and Q, wherein said law is experimentally established such that for a limited variation range of I, N and Q in a normal operating range of rotational speeds N for varying currents I, variation curves of N correspond to different values of Q as a function of I and are represented by segments of mutually parallel straight lines;

selecting a desired flow rate $Q_d$;

determining a current $I_1$ consumed by the motor and the moter's rotational speed $N_1$;

determining a flow rate $Q_1$ based on said law, said current $I_1$ and said rotational speed $N_1$;

comparing $Q_1$ to $Q_d$ to produce an error signal; and modifying power supplied to said motor based on said error signal.

2. The process of claim 1, wherein $Q_1$ is determined by calculation from measured values of said current $I_1$ and said rotational speed $N_1$.

3. The process of claim 1, wherein $Q_1$ is determined by reference to a table compiled to give values of Q corresponding to a current I and a rotational speed N.

4. The process of claim 1, further comprising controlling a supply voltage to said motor to correct the flow rate.

5. The process of claim 1, wherein said process is used to regulate the flow rate of an air current directed by a heating, ventilating or air conditioning installation into the passenger space of a vehicle.

6. A system for regulating flow rate of an air current, comprising:

a blower including an electric motor and a turbine driven by the motor;

means for experimentally establishing a law $Q=f(I, N)$ connecting a flow rate Q to current I consumed by the motor and rotational speed N of the motor by subjecting the turbine to a variable dynamic pressure to measure corresponding values of I, N and Q, wherein said law is experimentally established such that for a limited variation range of I, N and Q in a normal operating range of rotational speeds N for varying currents I, variation curves of N correspond to different values of Q as a function of I and are represented by segments of mutually parallel straight lines;

means for selecting a desired flow rate $Q_d$;

means for determining a current $I_1$ consumed by the motor and the motor's rotational speed $N_1$;

means for determining a flow rate $Q_1$ based on said law, said current $I_1$ and said rotational speed $N_1$, and for comparing $Q_1$ to $Q_d$ to produce an error signal; and means for modifying power supplied to said motor based on said error signal.

* * * * *